United States Patent Office 2,880,025
Patented Mar. 31, 1959

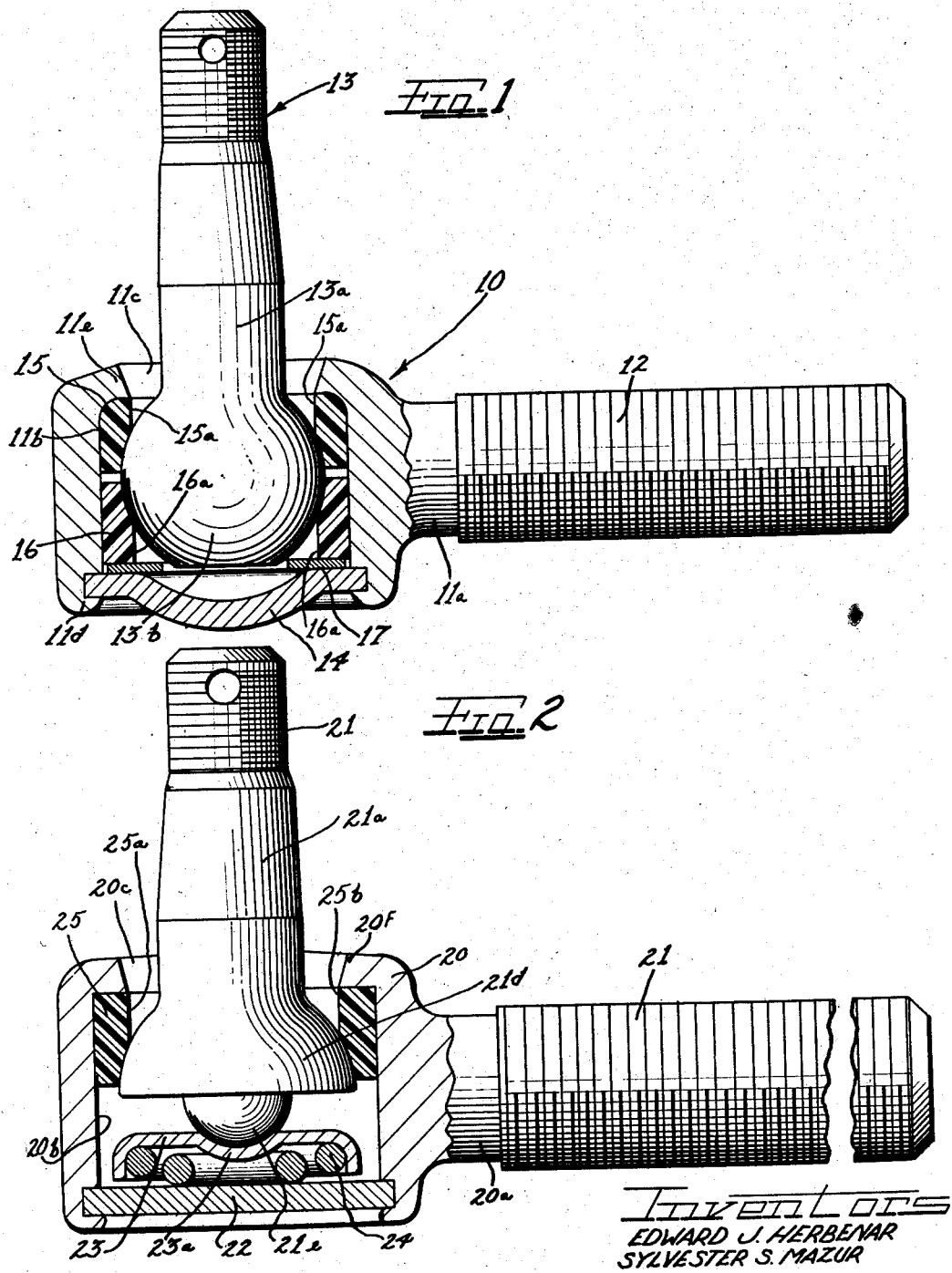

2,880,025

BALL AND SOCKET JOINT ASSEMBLY

Edward J. Herbenar and Sylvester S. Mazur, Detroit, Mich., assignors to Thompson Products, Inc., Cleveland, Ohio, a corporation of Ohio Application January 21, 1955, Serial No. 483,361

2 Claims. (Cl. 287—85)

The present invention relates to joint assemblies of the ball joint type used in tie rod connections and the like.

The present invention has particular reference to an improved bearing assembly used in ball joints, and interposed between the ball stud and the walls of its associated socket. While there are numerous types of bearings described in the art for this particular purpose, for the most part, these bearing assemblies are difficult and expensive to manufacture so that the cost of the bearing is a very significant part of the cost of the ball joint assembly.

The ball joint assembly of the present invention has several distinct advantages. From the manufacturing standpoint, the bearing employed in the ball joint assembly is extremely simple to manufacture and to insert into the housing during the assembly of the ball joint. From the operational standpoint, the bearing employed has characteristics which are not always matched even in the more elaborate type of bearing assemblies. For example, the bearing employed in the ball joint of the present invention has a shock dampening feature which dampens out vibrations from the wheels through the steering assembly and to the steering wheel. Furthermore, the nature of the bearing assembly permits a single lubrication of the joint to last for the life of the joint, thereby eliminating the necessity of providing a lubrication fitting in each ball joint. Further, the bearing assemblies are quite rugged and in most instances will last at least as long as the other elements of the joint assembly.

The joint assembly of the present invention provides a simplified construction without sacrifice of operational characterics. In a preferred form of the invention, the joint consists of a socket having a substantially cylindrical inner wall and a tubular or sleeve like bearing member of substantially uniform diameter forming a bearing lining between the inner socket wall and the head of the ball stud which is inserted into the socket. The bearing element according to this invention is composed of a semi-resilient composition having shock dampening properties. Such bearings may, for example, take the form of a sleeve of cotton duck fabric impregnated or coated with a synthetic resin. Alternatively, the bearing may be composed simply of a woven synthetic resin fabric such as nylon; a backing of fabric or rubber with a facing of the synthetic resin fabric or in some instances, the bearing may be a simple tubular extrusion or molded tube of nylon or other strong synthetic resinous material of the semi-resilient type.

The bearing compositions of the present invention have properties which make them distinct from other types of bearing members such as those composed of rubber, for example. A woven fabric coated or impregnated with a strong synthetic resin, or a fabric woven from filaments of the synthetic resin itself is not as resiliently flexible as rubber but neither can it be considered substantially rigid. Hence, we have referred to the bearing member as being "semi-resilient." This reduced resiliency, as compared to rubber, is frequently an advantage in respect to its ability to absorb shocks transmitted to the bearing.

With the foregoing in mind, an object of the present invention is to provide an improved ball joint assembly and, in particular, an improved bearing for use in such ball joint assemblies.

A further object of the present invention is to provide an inexpensive ball joint assembly which includes a self lubricating feature and does away with the necessity of providing lubrication fittings.

Another object of the invention is to provide an improved ball joint assembly containing a simplified, but highly effective bearing means which can be readily inserted into the housing and will function effectively for the life of the joint.

Other objects and features of the present invention will be apparent to those skilled in the art from the following description of the attached sheet of drawings which illustrate several preferred embodiments of the invention.

In the drawings:

Figure 1 is a view in elevation, and partially in cross-section illustrating one embodiment of the present invention; and, Figure 2 is a view similar to Figure 1, but illustrating a second modified form of the invention.

As shown in the drawings:

In Figure 1, reference numeral 10 indicates generally a tie rod joint which includes a socket 11 having a laterally extending threaded shank portion 11a for threaded engagement into the end of a tie rod assembly 12.

The socket 11 includes a generally cylindrical cavity 11b and, in its upper portion, is provided with an aperture 11c which freely receives the shank portion 13a of a stud generally indicated at numeral 13.

The stud 13 has a segmental spherical ball portion 13b which is loosely received within the cavity 11b. A closure plate 14 closes the bottom of the cavity 11b, and the socket 11 has a peened over portion 11d which tightly receives the peripheral edge of the closure plate 14.

The bearing assembly of the present invention, in the form illustrated in Figure 1, may consist of a pair of sleeve type bearings 15 and 16 in axial alignment within the cavity 11b. It will be appreciated that the two sleeves 15 and 16 can be replaced by a single sleeve, but the double sleeve bearing is preferred because it has inherently more flexibility. An undulating washer 17 is bottomed on the closure plate 14, and the natural resilience of the washer 17 urges the sleeves 15 and 16 together.

The outer periphery of the sleeves 15 and 16 is snugly received against the walls of the cavity 11b. The pair of sleeves 15 and 16 is restrained against vertical movement by an overhanging edge portion 11e in the socket 11.

At the central portion of the cavity 11b, the edge of the ball 13b tightly engages the inner walls of the sleeves 15 and 16 in good bearing contact. The upper and lower inner edges of the sleeves 15 and 16, however, which are generally indicated by 15a and 16a, are free to flex a limited amount in a radially inward direction. This ability to accommodate slight radial movement of the edges of the bearings without interference from the ball stud contributes to the ability of the joint assembly to resist sudden shocks. Thus, when the ball stud is subjected to severe vibration, the resulting impact of the stud against the central portion of the sleeves 15 and 16 causes the shock to be absorbed through flexure of the bearing elements rather than by binding of the bearing element against the ball stud, as might occur in the case of a closely fitting rubber bearing element.

The sleeves 15 and 16 are preferably composed at least in part of a synthetic resinous material having shock dampening properties, i.e., resistance to impact and inherent strength. A particularly preferred material for this use is the family of polyamide compositions known generically as nylon. Thus, the sleeves 15 and 16 may each consist of a woven mat of nylon filaments or, alternatively the sleeves 15 and 16 may contain a central core of a reasonably tough fabric such as cotton duck fabric either impregnated with or coated with a plastic composition such as nylon.

Bearing members of the type described have the further advantage that they are able to assimilate lubricant within their pores in substantial quantities. As a result, the bearing member may initially be loaded or packed with the lubricant and this single lubrication will suffice for the life of the joint, making additional lubrication fittings on the joint assembly unnecessary.

In the form of the invention shown in Figure 2, there is provided a socket 20 having a threaded shank portion 20a received in threaded engagement within a tie rod linkage 21. The socket 20 has a central cavity 20b and, at its upper end, is provided with an aperture 20c to permit movement of the shank portion 21a of a ball stud 21.

The cavity 20b is closed at the bottom end by the provision of a closure plate 22. The particular stud member shown in Figure 2 includes an enlarged head portion 21d and a depending, semi-spherical ball end 21e which is received in a recessed portion 23a of a spring seat 23. A helical spring 24 is bottomed on the closure plate 22 and urges the spring seat 23 into continuous engagement with the ball end 21e.

The bearing element illustrated in Figure 2 consists of a single sleeve 25 composed of one of the types of materials mentioned previously. In its original stage, the sleeve 25 has a substantially constant outer diameter which snugly engages the walls of the cavity 20b and a substantially uniform inner diameter 25a which is sufficiently large to provide a snug fit between the sleeve 25 and the headed portion 21d of the stud 21. Vertical movement of the sleeve 25 is restrained by an overhanging portion 20f of the socket 20.

As in the previously described form of the invention, an inner edge 25b of the sleeve 25 is in spaced relation to the ball stud so that it can flex a limited amount in a radially inward direction when the joint assembly is subjected to vibration. The semi-resilient nature of the sleeve 25 permits this flexure to result in a better dampening of the vibration than would occur if the ball stud were surrounded by a closely packed mass of rubber or the like.

In both of the described embodiments of the invention, the ball joint assembly can be very conveniently assembled from inexpensive materials. All that is necessary for the fabrication of the bearing, is to cut a suitable length or lengths from a tube of the resin impregnated fabric or the like and to insert this tube into the cavity prior to the insertion of the headed end of stud. Thus, machining operations are entirely eliminated and special jigs for holding the various elements during assembly are not required.

From the foregoing, it will be seen that the socket assembly of the present invention provides a simplified, but highly effective shock dampening ball joint assembly. Beside the excellent shock dampening qualities, the sockets have the advantage of low maintenance because of their ability to limit lubrication to a single lubrication at installation, and also provide a tough, strong bearing element having a longer life than many of the bearing elements presently used for the same purpose.

It will be evident that various modifications can be made to the described embodiments without departing from the scope of the present invention.

We claim as our invention:

1. A joint construction comprising a socket having a substantially cylindrical inner wall, a shoulder at one end of said wall defining an opening in one end of said socket, closure plate means mounted in the other end of said socket, a ball stud received within said socket, a pair of tubular bearing members each composed of a deformable synthetic resin material having shock dampening properties, each of said bearing members in its undeformed state being of substantially uniform inner and outer diameters, each of said bearing members being snugly received between said ball stud and said inner wall of said socket, each of said bearing members extending coaxially with said socket, one of said bearing members extending from said shoulder only to a point short of the midpoint of said ball, the other of said bearing members extending from said closure means to another point short of said midpoint of said ball so as to provide a space between said bearing members centrally of said socket and opposite said midpoint of said ball, said ball stud being of larger diameter than the undeformed inner diameter of said bearing members and being received against the end of said bearing members nearest said midpoint of said ball so as to deform said bearing members to provide a snug arcuate bearing surface for said ball.

2. A joint construction comprising a socket having a substantially cylindrical inner wall and a shoulder defined at one end thereof, a ball stud received within said socket, and at least one tubular bearing member composed of a deformable synthetic resin material having shock dampening properties, said bearing member in its undeformed state being of substantially uniform inner and outer diameters, said bearing member being snugly received between said ball stud and said inner wall of said socket, said bearing member extending coaxially with said socket from said shoulder only to a point short of the midpoint of said ball, said ball stud being of larger diameter than the undeformed inner diameter of said bearing member and being received against the end of said bearing member nearest said midpoint of said ball so as to deform said bearing member to provide a snug arcuate bearing surface for said ball.

References Cited in the file of this patent

UNITED STATES PATENTS

| | | |
|---|---|---|
| 1,930,676 | Farr | Oct. 17, 1933 |
| 2,076,028 | Hufferd | Apr. 6, 1937 |
| 2,118,990 | Todd | May 31, 1938 |
| 2,252,554 | Carothers | Aug. 12, 1941 |
| 2,292,675 | Thiry | Aug. 11, 1942 |
| 2,461,626 | Booth | Feb. 15, 1949 |
| 2,461,866 | Alldredge | Feb. 15, 1949 |
| 2,507,087 | Booth | May 9, 1950 |

OTHER REFERENCES

Wall: Product Eng., page 102, July 1950.